Sept. 24, 1940.  C. V. IREDELL ET AL  2,215,645
METHOD AND APPARATUS FOR TREATING TUNGSTEN, AND THE PRODUCT THEREOF
Filed Feb. 1, 1938
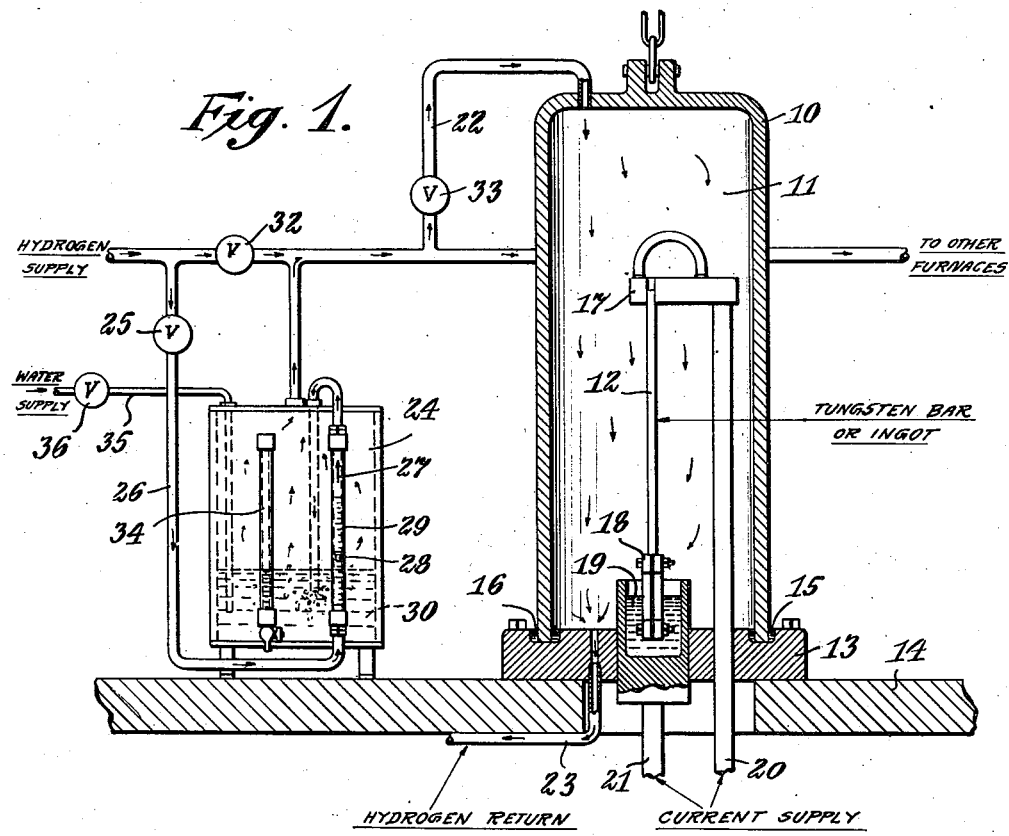
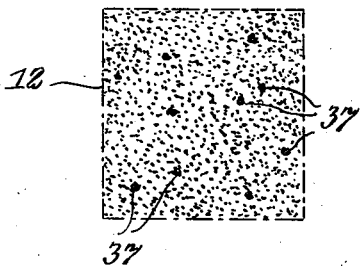
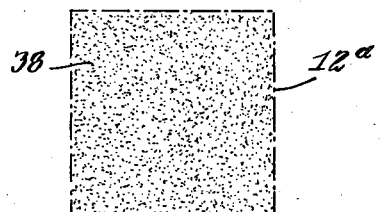
INVENTOR
C. V. IREDELL
T. J. HANKINS
BY
ATTORNEY Patented Sept. 24, 1940

2,215,645

UNITED STATES PATENT OFFICE 2,215,645

METHOD AND APPARATUS FOR TREATING TUNGSTEN, AND THE PRODUCT THEREOF

Charles V. Iredell, Bloomfield, and Thomas J. Hankins, Springfield, N. J., assignors to Westinghouse Electric & Manufacturing Company, East Pittsburgh, Pa., a corporation of Pennsylvania Application February 1, 1938, Serial No. 188,070

9 Claims. (Cl. 75—22)

This invention relates to the manufacture of tungsten wire and, more particularly, to a method and apparatus for treating tungsten ingots during the sintering process.

The principal object of our invention, generally considered, is the treatment of tungsten in order to improve its physical characteristics and particularly its granular arrangement.

Another object of our invention is to improve the quality of tungsten filament wire, particularly for vacuum type lamps.

A further object of our invention is to increase the strength of filament made from tungsten by controlling the crystallization characteristics of the material.

A still further object of our invention is to control the crystallization characteristics by heat treating tungsten at a critical stage or stages, in the process of manufacturing filament wire, while disposed in a hydrogen atmosphere having a definitely controlled range of water vapor content.

Other objects and advantages of the invention, relating to the particular arrangement and construction of the various parts, will become apparent as the description proceeds.

Referring to the drawing illustrating our invention:

Fig. 1 is an elevational view, with parts in vertical section, of apparatus embodying our invention.

Fig. 2 is a magnified cross sectional view of a tungsten ingot when manufactured in accordance with our invention.

Fig. 3 is a similar sectional view, for comparison, of another ingot which was treated in dry hydrogen, contrary to the teachings of our invention.

Prior to our invention, vacuum type tungsten filament lamps suffered from broken filaments at handling periods when tested at normal voltage, during certain time intervals, which trouble appeared like an epidemic. This coincided with short life, as well as poor strength of the filament. The breaking tendency increased as the size of the filament decreased. Upon investigation, we found that these epidemic-like intervals coincided with the use of filament wire from ingots which were pressed from tungsten powder and electrically sintered during periods of low atmospheric humidity. Conversely, ingots manufactured in periods of high humidity resulted in filaments much freer from breakage, thereby giving lamps having a longer life and greater strength.

We have found further that the humidity of the hydrogen atmosphere used during the electric heat-treating operation increased and decreased with the humidity of the outside atmosphere. This variation was apparently due to the fact that in the manufacturing operation the inside of the treating bottle, contact supports and other parts, become coated with volatilized compounds from the ingot which compounds are highly hygroscopic. This hygroscopic material picks up moisture from the air, when the humidity is high, and gradually gives off this moisture to the hydrogen during the heat-treating operation. On the other hand, when the outside atmosphere is low in humidity, less water vapor is absorbed by such compounds, with the result that the hydrogen is used with its original low water vapor content.

The method of our invention consists in performing the electric heat-treating operation on the prepared metal ingot in a hydrogen atmosphere containing a definite percentage of water vapor.

We preferably control this water vapor content by passing a certain proportion of the hydrogen which is used through water held at a definite temperature. We have found that the most suitable range of humidity is that obtained when from 10 to 17% of the hydrogen, used in the operation, is passed through water held at a temperature between 22° and 23° C. An idea of the actual water vapor content preferred by us may be realized from the fact that when 16.7% of the hydrogen is by-passed through water at 22° to 23° C., it contains about 80 m. g. per cubic foot at atmospheric pressure and normal room temperature of say 72° F. Otherwise, the heat-treating or sintering operation on the tungsten ingots is carried out under the same conditions as previously used.

Referring now to the drawing in detail, the reference numeral 10 represents a housing, bell jar or treating bottle providing a compartment 11 in which is mounted a tungsten bar or ingot 12 which may be formed as usual by pressing from tungsten powder. The jar 10 is positioned upon a support or block 13, in turn resting on a suitable base or table 14, and provided with grooves 15 containing mercury 16 for sealing the lower edges of the jar. The ingot 12 may have its upper end electrically connected to a clamping device 17, and its lower end carrying a clamp 18, of suitable conductive material, such as iron, which does not amalgamate with mercury. The lower end of said clamp dips into a pool of mercury 19. Electrical energy is supplied to the tungsten ingot 12 through leading-in conductors 20 and 21, respectively connected to the device 17 and mercury pool 19.

Hydrogen is introduced into the top of the treating compartment 11, as by means of a pipe 22, and exhausted through a pipe 23 for return to the gas house. In order to humidify the hydrogen to the desired extent, a tank 24 partly filled with water is provided and a part of the hydrogen by-passed through a valve 25, pipe 26, and hydrogen gauge 27. The latter may include a flow-actuated indicator 28 which moves up and down, in a generally vertical light-transmitting portion of the pipe 26, over a scale 29 to show the speed of the hydrogen passing therethrough. The outlet end of the pipe 26 bubbles into a quantity of water 30 and passes out of the tank 24 to unite with the supply pipe 22. Supply pipe 22 may be controlled by valves 32 and 33, the former being disposed between the junctions with the humidifying pipe 26 and the latter between the bell jar 10 and the nearest junction with the pipe 26. Water may be maintained in the tank 24 at the desired level, as shown by gauge 34, by means of water supply pipe 35 controlled by a valve 36.

The apparatus is desirably operated by first sweeping any air out of the jar 10 by passing hydrogen therethrough and then bringing the bar 12 up to sintering temperature by passing electrical current therethrough. It will be understood that the proportion of humidity in the hydrogen may be accurately controlled by adjusting the valves 25 and 32 so that the required proportion of the total hydrogen supply passes through valve 25 to be humidified in water tank 24 and united with the main hydrogen stream in pipe 22 between the valves 32 and 33. The valve 33, of course, controls the rate at which the humidified hydrogen passes through the bell jar 10, while the gauge 27 shows the rate at which the desired humidified portion of the hydrogen passes through the humidifier.

The temperature of the water 30 in the tank 24 is desirably maintained constant, or between 22 and 23° C. This temperature range was chosen, and is most conveniently maintained, as being a normal room temperature range, approximately corresponding with between 72 and 73° F. When the proper valve adjustments have been made so that between 10 and 17% of the hydrogen used passes through the humidifier, then electric current is passed through the tungsten bar 12 to sinter it for the desired length of time, that is, in accordance with the standard treating schedule.

It has been found that upon breaking a bar of tungsten, sintered in moist hydrogen in accordance with our invention, there is visible to the naked eye a differential in grain size, and large shiny grains 37 are noticeable throughout the section of the ingot 12 as compared with the uniformly fine grain structure 38 of the ingot 12a, shown in Fig. 3 as representative of one sintered in dry hydrogen.

As showing the effect of wet hydrogen in the ingot heat-treating operation, we have found that when treating a certain lot with dry hydrogen, we produced metal having a grain count of 12,000 with 60% bump failures for a 10-watt filament. When a similar ingot was sintered in hydrogen, 16.7% of which was humidified in accordance with our invention, the grain count was reduced to 8580 and the percentage of bump failures to zero.

As another example of what is accomplished by practicing our invention, an ingot of another lot when treated in dry hydrogen resulted in a grain count of 9080 having 20% bump failures for 10-watt filament. When an ingot of this lot was treated in hydrogen, 16.7% of which was humidified in accordance with our invention, the grain count was reduced to 7200 and the percentage of bump failures to zero.

We have found that the most suitable types of tungsten metal to react to the wet hydrogen treatment are those which possess a grain count, when treated in dry hydrogen, of 12,000 or under and preferably under 10,000. We have also found it preferable to use metals which give a lineal shrinkage of 15% or more when treated in dry hydrogen.

While we will not attempt to definitely state the reasons why heat treating under the above mentioned conditions in wet hydrogen results in such a noticeable improvement in toughness and strength, the following theory is advanced as a possible explanation.

In order to reduce or eliminate broken filaments in a vacuum type lamp, it is desirable to obtain a wire which will crystallize closer to the clamp at the flashing temperature. When this is done there is a shorter lever arm effect between the lead and the junction between the crystallized and drawn structures, with the result that the filament is capable of resisting a greater shock. Wire which will crystallize at relatively low temperatures will do this closer to the clamp when flashed. The tendency towards crystallization at a lower temperature is increased by the presence of a gradient across the metal. Such a gradient may be due to temperature, grain size, or work strain. A gradient in work strain is brought about by a differential in grain size in the treated ingot and a noticeable differential in grain size is brought about, in accordance with our invention, by treating in an atmosphere of wet hydrogen.

Inasmuch as the humidity of the hydrogen depends to some extent on that of the atmosphere, so that said humidity will vary if the humidity conditions of the atmosphere vary, even though the proportion of hydrogen bubbled through water is maintained constant as well as the temperature of the water, it is desirable, in order to accurately maintain the proportion of moisture in the hydrogen used, to conduct the manufacturing operations in a factory which is air conditioned or which will maintain constant the temperature and moisture conditions under which the operations are performed.

Although a preferred embodiment of our invention has been disclosed, it will be understood that modifications may be made within the spirit and scope of the appended claims.

We claim:

1. The method of treating tungsten ingots to improve the quality of wire which may be drawn therefrom, comprising heating said ingots prepared by pressing normal tungsten powder in the normal manner, to normal temperatures, on a standard treating schedule, in an atmosphere of hydrogen, at least a portion of which has been passed through water until it contains about eighty milligrams per cubic foot.

2. The method of treating tungsten ingots to improve the quality of wire which may be drawn therefrom, comprising heating said ingots to normal sintering temperatures in an atmosphere of hydrogen which has been humidified by passing from 10 to 17% thereof through water maintained at a temperature of between 22 and 23° C.

3. The method of manufacturing tungsten comprising pressing the powdered metal to produce an ingot and heating said ingot to normal sintering temperatures by passing electric current therethrough while the same is maintained in an atmosphere of hydrogen, about 16.7% of which has been humidified by bubbling through water maintained at a temperature of between 22 and 23° C.

4. Apparatus for treating tungsten ingots comprising a housing for enclosing the ingot, means for conducting electricity to said ingot to heat it to sintering temperatures, means for bubbling hydrogen through water for humidifying purposes, means for mixing said humidified hydrogen with a proportion of dry hydrogen, and means for circulating said mixture through said housing during the sintering operation.

5. Apparatus for treating tungsten ingots comprising means for conditioning the air, a housing disposed in said conditioned air for enclosing an ingot, means for conducting electricity to said ingot to heat it to sintering temperatures, said housing having a hydrogen inlet at the top and a hydrogen outlet at the bottom, means for conducting hydrogen to said inlet, and means for by-passing a definite proportion of said hydrogen so that it bubbles through water and is subsequently mixed with the remainder of the hydrogen prior to entering the housing, and means for maintaining said water at a predetermined temperature.

6. Apparatus for treating tungsten ingots comprising a housing for enclosing an ingot, means for mounting an ingot in said housing and conducting electrical energy thereto, a water tank provided with a gauge, a hydrogen supply line connected to said housing, a by-pass in said line, valves for adjusting the proportion of hydrogen which goes through said by-pass and bubbles through water in said tank during operation, a gauge for showing the flow of hydrogen through said tank, and means for maintaining the water at a predetermined temperature.

7. Means for supplying hydrogen, humidified to a desired extent, comprising a main pipe line leading from a supply of hydrogen to a place of use, a tank partly filled with water, a by-pass pipe from said main pipe line, terminating in an outlet below the level of the water in said tank, whereby hydrogen bubbles through said water, a generally vertical light-transmitting portion of said by-pass pipe, a flow-actuated indicator in said portion, adapted to move up and down to show by its position the speed of the hydrogen flow therethrough, and a continuation by-pass pipe connecting said tank above the water level with said main pipe line beyond the union with the by-pass pipe, a valve in said by-pass pipe, and a valve in that part of the main pipe line between the connections with the by-pass and continuation by-pass lines, in order to accurately control the proportion of hydrogen passing through said humidifier.

8. Metallic tungsten, in which the sintered ingot has a fine grained structure with individual large grains scattered through its cross-section in a fairly uniform manner, that is, with no substantial difference between the large grain concentration near the surface, and that in the center, so that wire produced therefrom will crystallize closer to the clamp and be less subject to breakage when used in a lamp.

9. Metallic tungsten, produced by pressing the powdered metal to form an ingot and heating said ingot to normal sintering temperatures, by passing electric current therethrough, while the same is maintained in an atmosphere of hydrogen, from 10 to 17% of which has been passed through water maintained at a temperature of between 22 and 23° C., in which the sintered ingot has a fine grained structure with individual large grains scattered through its cross-section in a fairly uniform manner, that is, with no substantial difference between the large grain concentration near the surface and that in the center, so that wire produced therefrom, when used as a filament in an incandescent electric lamp, will crystallize closer to the clamp and be less subject to breakage in service.

CHARLES V. IREDELL.
THOMAS J. HANKINS.